No. 707,261. Patented Aug. 19, 1902.
E. RUTTKAMP.
MIXING MACHINE.
(Application filed Feb. 24, 1902.)
(No Model.)
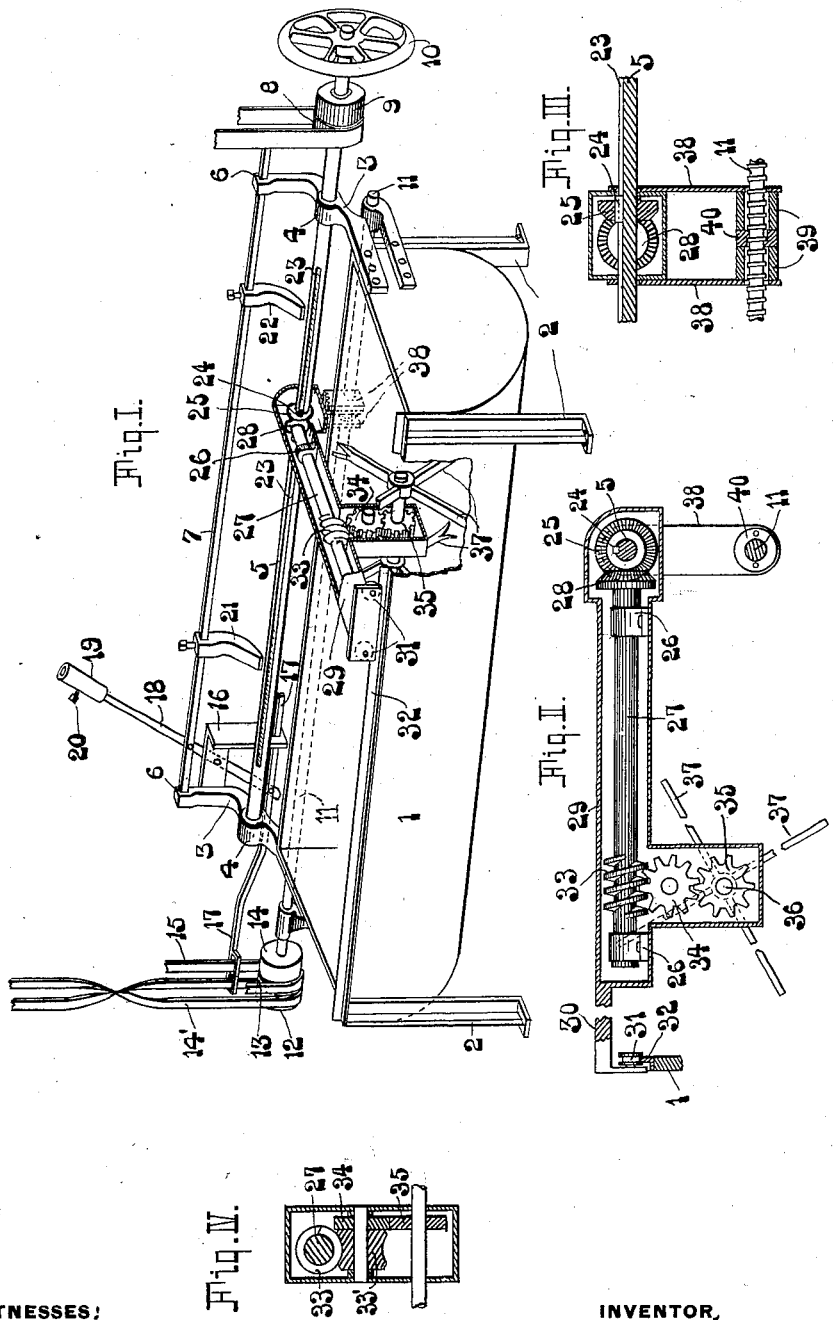
WITNESSES:
Geo. N. Harvey.
F. N. Barber.
INVENTOR,
Ernest Ruttkamp,
by Wm. L. Pierce,
his Attorney.
THE NORRIS PETERS CO., PHOTO-LITHO., WASHINGTON, D. C.

UNITED STATES PATENT OFFICE.

ERNEST RUTTKAMP, OF ALLEGHENY, PENNSYLVANIA, ASSIGNOR OF ONE-HALF TO CHARLES RUTTKAMP, OF ALLEGHENY, PENNSYLVANIA.

MIXING-MACHINE.

SPECIFICATION forming part of Letters Patent No. 707,261, dated August 19, 1902.

Application filed February 24, 1902. Serial No. 95,201. (No model.)

*To all whom it may concern:*

Be it known that I, ERNEST RUTTKAMP, a citizen of the United States, residing at Allegheny, in the county of Allegheny and State of Pennsylvania, have invented or discovered new and useful Improvements in Mixing-Machines, of which the following is a specification.

In the accompanying drawings, which make part of this specification, Figure I is a perspective of my invention with portions in section and broken away to show concealed parts. Fig. II is a vertical section of the mechanism for driving the mixing-arms. Fig. III is a section in detail, showing the means for causing the travel of the carriage. Fig. IV is a detail showing the means for transmitting the power from shaft 27 to blades 37 37.

It is the object of my invention to produce a dough-mixing machine whereby the mechanism bearing the mixing-arms may be automatically reversed as it reaches the ends of the mixing-trough.

It is also an object of my invention to so mount the traveling mixer that it may be raised out of the trough to give free access thereto.

1 represents a semicylindrical trough, into which the dough to be mixed is placed. The trough is supported on legs 2 or by any approved means. At the upper part of the rear of the trough I secure two rearwardly-extending brackets or arms 3, having therein bearings 4 for the main shaft 5 and guide-openings 6 for the shifting-bar 7. The shaft 5 has at its right-hand end the usual fixed and loose pulleys 8 and 9 and a balance-wheel 10. Mounted below shaft 5 is a second shaft 11, provided with a screw-thread for the whole of its length opposite the trough 1. Its left-hand end is provided with two loose pulleys 12 and 14 and an intermediate fixed pulley 13. As shown in Fig. I, twisted belt 14' is on loose pulley 12 and straight belt 15 is on fixed pulley 13. A bracket 16 is fixed to one arm 3 and extends horizontally toward the right and then forwardly. The forward portion thereof projects downwardly and forms a bearing for the belt-shifting bar 17, provided with eyes or loops to receive the belts 14' and 15. A lever 18 is pivotally attached to the bars 7 and 17 and to the bracket 16. An overthrow-weight 19 is adjustably secured to the lever 18 by the set-screw 20. Two stops 21 and 22 are slidable along the bar 7 and are held in any desired position by means of set-screws. These stops extend downwardly and forwardly into the line of travel of the carriage, to be hereinafter described.

The shaft 5 is provided with a long groove 23, in which travels a spline 24, fixed in the bevel gear-wheel 25. By this construction the wheel 25 must rotate with the shaft 5, but can slide along the same.

Supported in bearings 26 26 is a shaft 27, which has a bevel-gear 28 meshing with bevel-gear 25. This shaft, together with the bevel-gears, is inclosed in a housing 29, which lies transversely over the trough 1. The bearings 26 are supported on the floor of the housing. The forward end of the housing has an arm 30, which reaches out over the edge of the trough and is turned downwardly and provided with guide-wheels 31, which travel on the track 32 on the trough. The shaft 27 has a worm 33 meshing with worm-wheel 33'. On the same shaft with the worm-wheel 33' is pinion 34, which meshes with pinion 35 on shaft 36, having secured at one end four dough-mixing arms or blades 37. The housing 29 has an extension which incloses the worm-wheel 33' and pinions 34 and 35.

To the sides of the housing 29 are secured the hangers or plates 38, between whose lower ends are secured the sleeves 39 and the nut 40. The screw-shaft 11 passes through these sleeves and nut, the latter being fixed between the sleeves, so as to prevent its rotation.

The operation is as follows: Normally the carriage will be raised to a vertical position on the shaft 5. A batch of dough is placed in the trough 1 and the carriage swung down so that the guide-wheels 31 are on the track 32 and the blades 37 are in the dough. The belt is shifted from idle pulley 9 to fixed pulley 8, whereupon the shafts 5, 27, and 36 rotate, causing the arms or blades 37 to pass in succession through the dough. When the shaft 5 is started, power should be applied to the belts 14' and 15, causing the mixer to travel along the screw-shaft 11 at the same time that mixing-arms mix the dough. When the carriage or housing 29 reaches one of the stops, as 21, the further movement of the carriage shoves the bar 7 to the left. When the overbalancing-weight 19 passes the vertical line of the pivot of the lever 18, it quickly throws the belt-shifting bar 17 over to the right, causing the crossed belt 14' to run on the fixed pulley 13 and the straight belt to run on the loose pulley 14, thus causing the rotation of the screw-shaft to be reversed. The carriage then travels to the right till it engages the stop 22 and causes the shifting-bar 17 to shift the belts back to the position shown in Fig. I, thereby reversing the travel of the carriage. This operation is continued till the dough is sufficiently mixed, whereupon the carriage is raised on the shaft 5 and the dough removed.

Having described my invention, I claim—

1. In a mixing-machine, a trough and a rotary mixing device having relative longitudinal movement, and means for reversing said movement, said device being capable of removal by oscillation from over said trough.

2. In a mixing-machine, a trough and a rotary mixing device having relative longitudinal movement, and means for reversing said movement, said device being removable from over said trough by oscillation on an axis substantially parallel to the line of said longitudinal movement.

3. In a mixing-machine, a trough and rotary mixing-blades having relative longitudinal movement, a shaft for producing the longitudinal movement, a shaft external to the trough for rotating the blades, and means supporting the blades and slidable on the latter shaft.

4. In a mixing-machine, a trough, a carriage provided with rotary mixing-blades and having longitudinal and vertical movements, and means for reversing the longitudinal movement.

5. In a mixing-machine, a trough, a carriage provided with rotary mixing-blades and having longitudinal and vertical movements, and automatic means for reversing the longitudinal movement.

6. In a mixing-machine, a trough and rotary mixing-blades having relative longitudinal movement, said blades being capable of removal from over the trough and any selected point therein rotating transversely of the line of said longitudinal movement.

7. In a mixing-machine, a trough, a carriage provided with mixing-blades, a driving-shaft, driving connections between said shaft and blades permitting the travel of the carriage on said shaft, a rotatable screw-shaft, a nut in said carriage to receive the screw-shaft, and means controlled by the carriage for reversing the rotation of the screw-shaft.

8. In a mixing-machine, a trough, a carriage provided with mixing-blades, a driving-shaft, driving connections between the shaft and the blades, permitting the travel of the carriage on said shaft, a second driving-shaft, connections between the latter and the carriage for causing travel of the carriage, and means for automatically reversing the rotation of the second driving-shaft.

9. In a mixing-machine, a trough, a carriage provided with mixing-blades and having longitudinal travel over said trough, a driving-shaft, a bevel-gear splined on the shaft, a second shaft mounted on the carriage and having a bevel-gear meshing with the splined gear, a worm on the second shaft, and gearing between the worm and the blades for driving the latter.

10. In a mixing-machine, a trough, a carriage provided with mixing-blades, means for driving the carriage, a sliding bar, stops on the bar, connections from said bar for reversing the movement of the carriage, and an overthrow-lever associated with the bar.

Signed at Pittsburg this 17th day of February, 1902.

ERNEST RUTTKAMP.

Witnesses:
GEO. H. HARVEY,
D. C. HAWES.